(12) United States Patent
Baldwin et al.

(10) Patent No.: US 8,399,765 B1
(45) Date of Patent: Mar. 19, 2013

(54) SAFETY OUTLET COVER

(75) Inventors: Jeffrey P. Baldwin, Phoenix, AZ (US); Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 639 days.

(21) Appl. No.: 12/638,857

(22) Filed: Dec. 15, 2009

Related U.S. Application Data

(63) Continuation-in-part of application No. 11/872,843, filed on Oct. 16, 2007, now Pat. No. 7,633,009, which is a continuation-in-part of application No. 11/556,320, filed on Nov. 3, 2006, now Pat. No. 7,541,541.

(60) Provisional application No. 61/245,369, filed on Sep. 24, 2009.

(51) Int. Cl.
*H02G 3/14* (2006.01)
*H05K 5/03* (2006.01)

(52) U.S. Cl. ............. 174/67; 174/66; 220/241; 220/242

(58) Field of Classification Search .................... 174/66, 174/67, 135; 220/241, 242, 3.8; 439/145, 439/195, 137, 136, 148, 346, 732, 140
See application file for complete search history.

(56) References Cited

U.S. PATENT DOCUMENTS

| | | | |
|---|---|---|---|
| 2,818,991 A * | 1/1958 | Hess | 220/242 |
| 2,820,842 A * | 1/1958 | Meistrell | 174/67 |
| 2,988,242 A * | 6/1961 | Kneip | 220/242 |
| 3,068,442 A | 12/1962 | Kubik | |
| 3,810,070 A | 5/1974 | Ludwig | |
| 3,840,692 A | 10/1974 | Wells | |
| 3,865,456 A * | 2/1975 | Dola | 439/137 |
| 4,094,569 A | 6/1978 | Dietz | |
| 4,257,659 A | 3/1981 | Gibbs | |
| 4,600,258 A | 7/1986 | Hu | |
| 4,640,564 A * | 2/1987 | Hill | 439/137 |
| 4,733,017 A | 3/1988 | Wolfe-Taylor et al. | |
| 4,793,818 A | 12/1988 | Poirier | |
| 4,798,916 A | 1/1989 | Engel et al. | |
| 4,857,004 A | 8/1989 | Poirier | |
| 4,952,755 A | 8/1990 | Engel et al. | |
| 4,970,349 A | 11/1990 | Jones | |
| 5,026,299 A * | 6/1991 | Foulk | 439/137 |
| 5,212,347 A * | 5/1993 | Powers et al. | 174/67 |
| 5,240,426 A * | 8/1993 | Barla | 439/136 |
| 5,288,945 A | 2/1994 | Bruce | |
| 5,813,873 A | 9/1998 | McBain | |
| 5,998,735 A * | 12/1999 | Patterson, Jr. | 174/67 |
| 6,222,125 B1 | 4/2001 | Shoemaker | |
| 6,372,987 B1 * | 4/2002 | Ha | 174/67 |
| 6,384,354 B1 | 5/2002 | Shotey et al. | |
| 6,545,218 B1 * | 4/2003 | Blaess | 174/67 |
| 6,699,050 B1 | 3/2004 | Wong | |
| 7,094,969 B1 | 8/2006 | In | |
| 7,098,403 B2 * | 8/2006 | Jolley | 174/67 |
| 2003/0019652 A1 | 1/2003 | Shoemaker | |
| 2004/0256134 A1 | 12/2004 | Jolley | |

\* cited by examiner

*Primary Examiner* — Angel R Estrada
(74) *Attorney, Agent, or Firm* — Booth Udall Fuller, PLC

(57) ABSTRACT

A safety outlet cover assembly that includes at least one button opening on a side of the cover base and at least one button opening on an opposite side of the cover base through which buttons are coupled to the base. The safety cover assembly may also include a cover configured to slide along a track on the cover base such that the cover is slidably coupled to the cover base and covers a socket face of the receptacle. The buttons may be squeeze tabs and the cover may be a split cover or include a spring element that automatically returns the cover to a closed position from an open position when an electrical plug is removed from the receptacle.

14 Claims, 15 Drawing Sheets

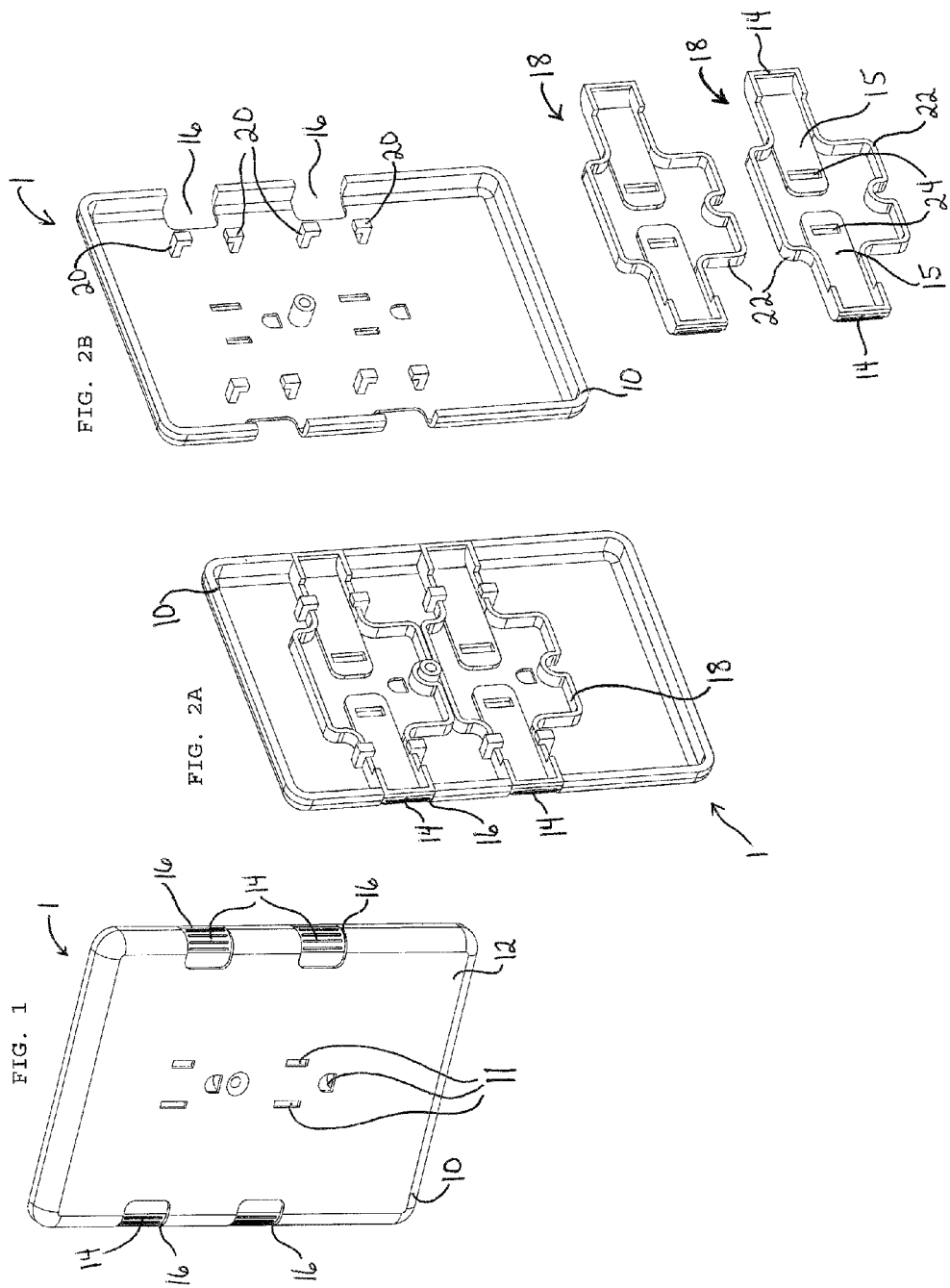

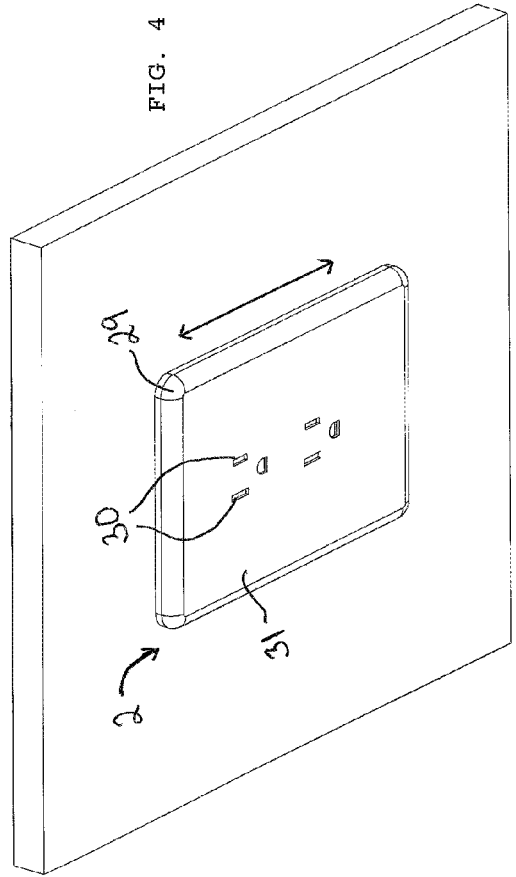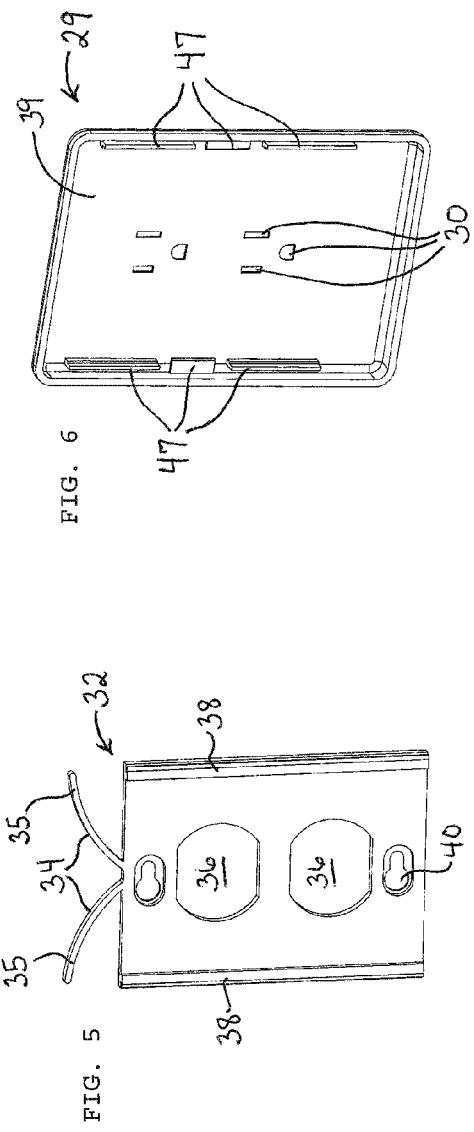

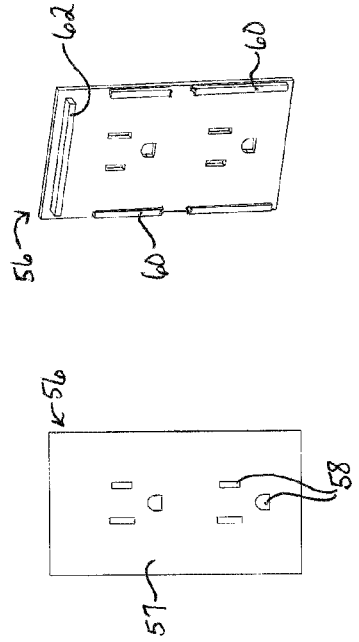
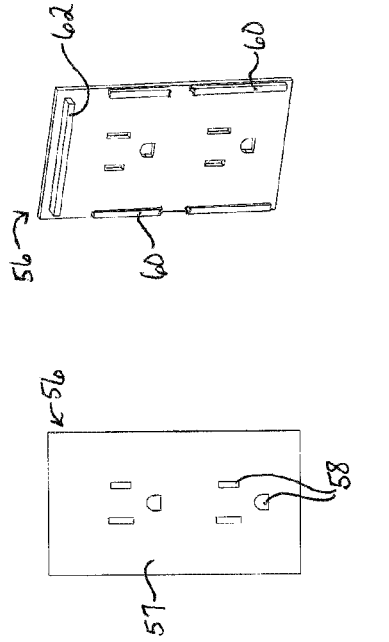
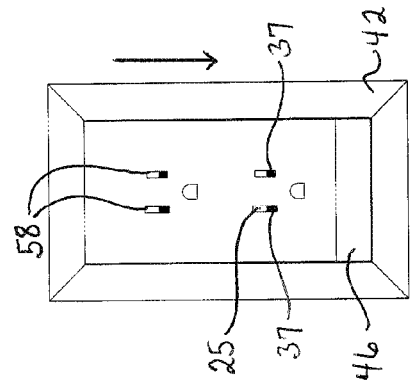
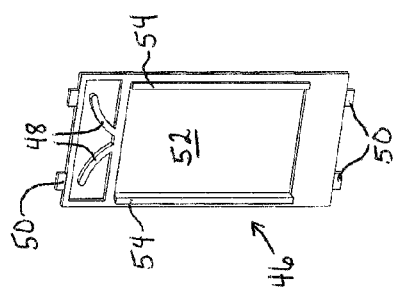
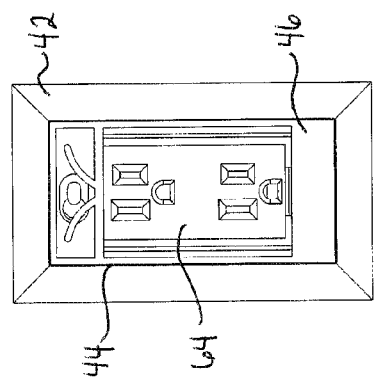
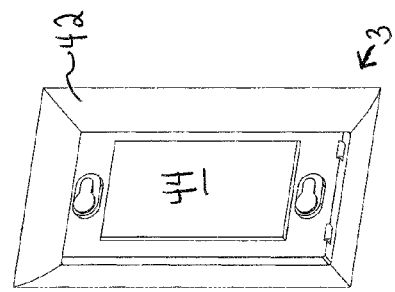
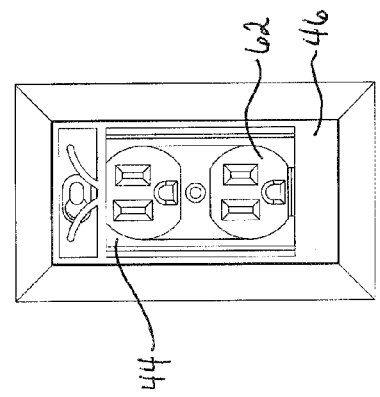

SAFETY OUTLET COVER

CROSS REFERENCE TO RELATED APPLICATIONS

This application is a continuation-in-part of U.S. Utility Patent Application by Jeffrey P. Baldwin entitled "Safety Outlet Cover" serial number, which issued as U.S. Pat. No. 7,633,009 on Dec. 15, 2009 which is a continuation-in part of U.S. Utility Patent Application by Jeffrey P. Baldwin entitled "Safety Outlet Cover" which issued as U.S. Pat. No. 7,541,541 on Jun. 2, 2009. This document also claims the benefit of the filing date of U.S. Provisional Patent Application 61/245,369, to Jeffrey P. Baldwin entitled "Tamper Resistant Wallplate," which was filed on Sep. 24, 2009 and is herein incorporated by reference.

BACKGROUND

1. Technical Field

Aspects of this document relate generally to covers for electrical devices.

2. Background Art

Covers are used to prevent access to the energized exposed metal wires supplying power to electrical devices mounted in the conventional electrical boxes used in residential and commercial buildings. Conventional covers contain openings that allow the faces of devices like receptacles to be exposed so that electrical plugs or connectors can be inserted into or coupled with the devices. For receptacles, the openings in the face are large enough to permit insertion of small electrically conductive objects by children, exposing them to the risk of electric shock. Various safety covers have been devised to reduce or eliminate the risk of electric shock from electrical devices. These covers are typically semi-permanent, mounted to the electrical device, and work by preventing access to the electrical device to those who lack adult strength or dexterity.

SUMMARY

One aspect of particular implementations of a safety cover assembly for an electrical outlet comprises a cover base comprising at least one electrical outlet receptacle face aperture extending through a surface thereof and being large enough to receive at least one face of an electrical receptacle therein, the cover base further comprising at least two button openings, at least one each on opposing sides of the cover base, a cover slidably coupled to the cover base and comprising at least an open position in which the at least one receptacle face aperture is exposed enough to receive an electrical cord cap therein and a closed position in which the at least one receptacle face aperture is covered by the cover, and at least two cover release buttons, one extending through each of the button openings in the base, the cover release buttons each operatively coupled to the cover base and biased to an engaged position in which the cover release buttons engage the cover and restrict its sliding movement within the cover base; wherein simultaneous activation of the two cover release buttons releases the cover and allows it to slidably move in relation to the cover base.

In particular implementations, a safety cover assembly may comprise one or more of the following. The cover may further be slidably moveable to a second open position in which at least a second receptacle face aperture is exposed enough to receive the electrical cord cap. The at least two button openings may comprise at least button openings, at least two each on opposing sides of the cover base, each button opening positioned adjacent a receptacle face aperture and having one of the at least two cover release buttons operatively engaged therein. Activation of the opposing buttons adjacent the second receptacle face aperture may release the cover and allow it to slidably move to the second open position. The buttons may be squeeze tabs. The at least two button openings may comprise at least four button openings, at least two each on opposing sides of the cover base, each button opening positioned adjacent one of the at least one receptacle face aperture and having one of the at least two cover release buttons operatively engaged therein. The cover may be a split cover comprising at least two cover elements. The at least one receptacle face aperture may comprise at least two receptacle face apertures, wherein each of the at least two cover elements is configured to independently slide away from the other of the at least two cover elements when respective opposing buttons adjacent each of the cover elements is simultaneously activated. Each of the at least two cover elements may be biased to its closed position such that when an electrical plug cap is removed from a corresponding receptacle face within the receptacle face aperture associated with the cover element, the corresponding cover slides along the track to its closed position and covers the corresponding receptacle face. The at least one cover may be biased to its closed position such that when an electrical plug cap is removed from a receptacle face within the receptacle face aperture, the cover slides along the track to its closed position and covers that receptacle face.

In another aspect, a safety cover assembly comprises at least two button openings, one each on opposing sides of the cover and at least one safety insert comprising two cover buttons, one extending through each of the button openings in the base, each of the at least two cover buttons being operatively associated with a spring element and a blocking element comprising at least one plug blade aperture therethrough, wherein the at least one safety insert with its two cover buttons, plug blade aperture blocking elements and spring element are all formed as a single piece, and wherein the safety insert is coupled to a rear surface of the cover through a plurality of mounting projections and wherein the blocking element is configured to permit at least one electrical plug blade to enter a plug blade socket in a face of a receptacle located behind the cover through the at least one plug blade aperture in the blocking element when the safety insert is in a biased position.

In particular implementations, a safety cover assembly may further comprise one or more of the following. The cover may further comprise a plurality of plug blade apertures through a front surface of the cover, the cover configured to cover a majority of a face of a receptacle face on which the cover is installed, except a plurality of plug blade apertures in receptacle face corresponding to the plurality of plug blade apertures extending through the front surface of the cover. The safety insert may comprise a biased position in which the two cover buttons have been squeezed toward each other and an unbiased position in which the two cover buttons are not squeezed toward each other, wherein in the biased position, the plug blade apertures of each of the blocking elements is aligned with a plug blade aperture of the front surface of the cover and a in the unbiased position the plug blade apertures of each of the blocking elements is unaligned with a plug blade aperture on the front surface of the cover.

In yet another aspect, a safety cover assembly for an electrical outlet may comprise a cover base comprising at least one electrical outlet receptacle face aperture extending through a surface thereof and being large enough to receive at least one face of an electrical receptacle therein, the cover base further comprising a track thereon, the track spanning the at least one electrical outlet receptacle face aperture, a cover slidably coupled to the track of the cover base and comprising at least an open position in which the at least one receptacle face aperture is exposed enough to receive an electrical cord cap therein and a closed position in which the at least one receptacle face aperture is covered by the cover, at least one cover release slidably coupled to the cover between a latch position and an unlatch position, wherein when the cover is in its closed position and the cover release is in its latch position, the cover release seats in a latch recess at an edge of the track and resists the cover from sliding within the track and when the cover release is in its unlatch position the cover release does not resist the cover sliding within the track to the open position. In particular implementations, the cover may be biased to its closed position and the cover release may be biased to its latch position.

The foregoing and other aspects, features, and advantages will be apparent to those artisans of ordinary skill in the art from the DESCRIPTION and DRAWINGS, and from the CLAIMS.

Unless specifically noted, it is intended that the words and phrases in the specification and the claims be given their plain, ordinary, and accustomed meaning to those of ordinary skill in the applicable arts. The inventor is fully aware that he may be his own lexicographer if desired. The inventor expressly elects, as his own lexicographer, to use only the plain and ordinary meaning of terms in the specification and claims unless it is clearly stated otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶6. Thus, the use of the words "function," "means" or "step" in the Description or claims is not intended to somehow indicate a desire to invoke the special provisions of 35 U.S.C. §112, ¶6, to define the disclosure. To the contrary, if the provisions of 35 U.S.C. §112, ¶6 are sought to be invoked to define the applications disclosed herein, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. §112, ¶6. Moreover, even if the provisions of 35 U.S.C. §112, ¶6 are invoked to define the claimed applications disclosed herein, it is intended that the disclosure not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

BRIEF DESCRIPTION OF THE DRAWINGS

Various implementations and aspects will hereinafter be described in conjunction with the appended drawings, where like designations denote like elements, and:

FIG. 1 is a front perspective view of a safety cover assembly;

FIG. 2a is a rear perspective view of a safety cover assembly;

FIG. 2b is a rear perspective exploded view of the cover and spring elements illustrated in FIG. 2a;

FIG. 4 is a front perspective view of a safety cover assembly;

FIG. 5 is a front perspective view of a mounting plate with a spring element including two curved projections attached to the mounting plate at only one end;

FIG. 6 is a rear perspective view of a cover with plug blade apertures and cover rail members;

FIG. 9 is a front perspective view of a frame with a mounting aperture;

FIG. 10 is a front perspective view of a mounting plate with mounting projections;

FIG. 11a is a front perspective view of a cover with plug blade apertures;

FIG. 11b is a rear perspective view of the cover of FIG. 11a showing a bias projection;

FIG. 12 is a front view of a frame with a mounting plate installed over a duplex receptacle;

FIG. 13 is a front view of a frame with a mounting plate installed over a ground fault current interrupter receptacle;

FIG. 14 is a front view of an assembled safety cover assembly including a frame, a mounting plate, and a cover installed over a receptacle;

DESCRIPTION

Figure 3:
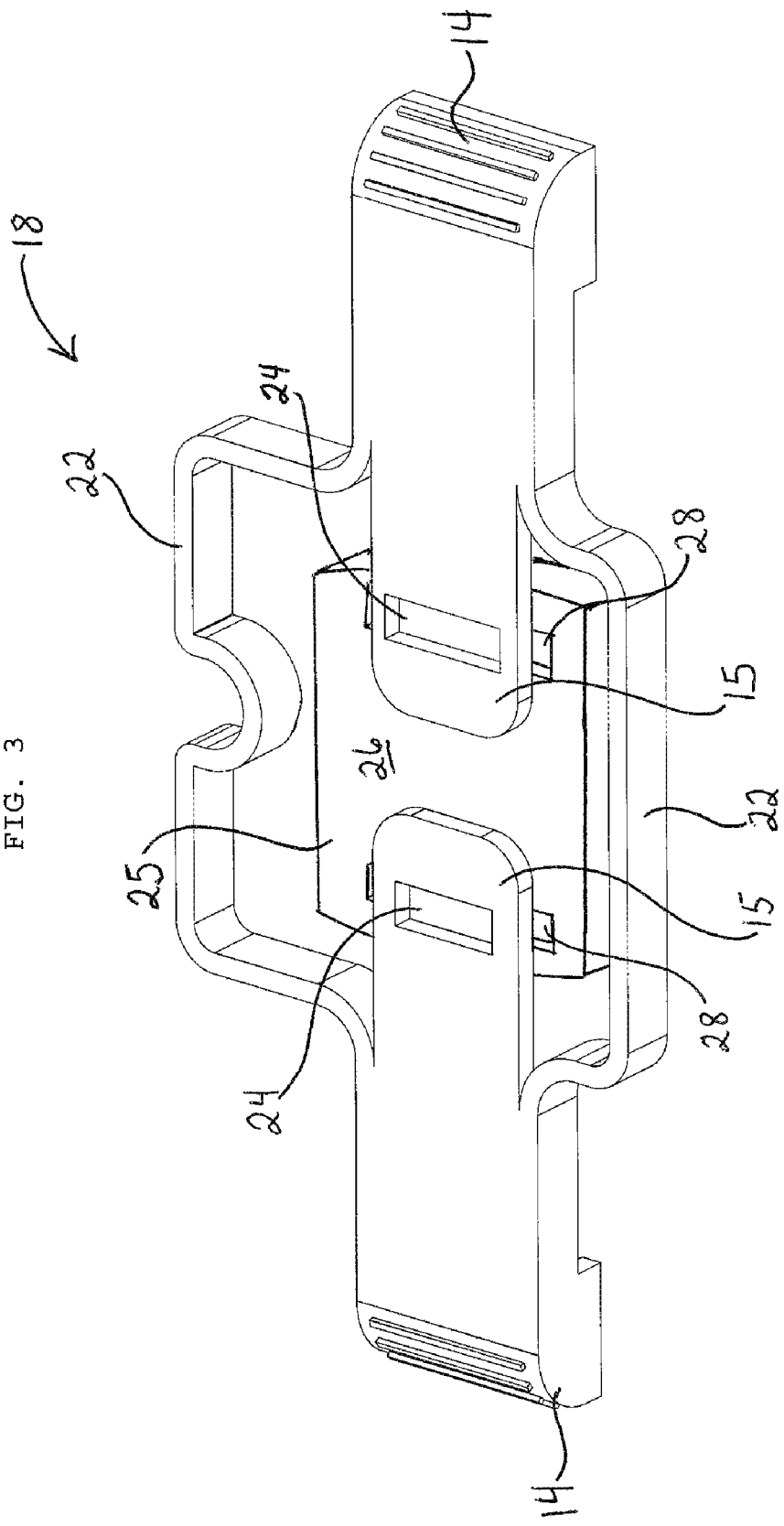
FIG. 3 is a detail perspective view of a spring element placed over a receptacle showing the alignment of the plug blade apertures with the plug blade sockets in the receptacle face when the buttons are under pressure in the biased position.

This disclosure, its aspects and implementations, are not limited to the specific components or assembly procedures disclosed herein. Many additional components and assembly procedures known in the art consistent with the intended safety outlet cover and/or assembly procedures for a safety outlet cover will become apparent for use with implementations of safety outlet covers from this disclosure. Accordingly, for example, although particular covers, mounting plates, spring elements, and receptacles are disclosed, such covers, mounting plates, spring elements, and receptacles and implementing components may comprise any shape, size, style, type, model, version, measurement, concentration, material, quantity, and/or the like as is known in the art for such covers, mounting plates, spring elements, and receptacles and implementing components, consistent with the intended operation of a safety outlet cover.

FIG. 1 illustrates a particular implementation of a safety outlet cover assembly 1 (hereafter "cover assembly"). The cover assembly 1 of this implementation may include a cover 10 with button openings 16 located in its sides and a plurality of plug blade apertures 11 in its front face 12. When no pressure is being exerted on the buttons 14, the cover assembly 1 may be in a rest position, and the buttons may be configured to be substantially flush with the outer edge of the sides of the cover 10.

Referring to FIGS. 2a and 2b, a rear view of the particular implementation illustrated in FIG. 1 is shown. Safety inserts 18 may be coupled with the cover 10 through a plurality of mounting projections 20 or through some other method that may allow the safety inserts 18 to slidably couple with the cover 10. The safety inserts 18 may include the buttons 14 which are coupled with spring elements 22 and blocking elements 15 which may include plug blade apertures 24.

FIG. 3 illustrates a particular implementation of a safety insert 18. The safety insert 18 is shown mounted over a receptacle 25 with the cover 10 removed for illustrative purposes. The receptacle 25 may have a receptacle face 26 in which a one or more plug blade sockets 28 are located. As illustrated, when inward pressure is exerted on both buttons 14 of the safety insert 18, the spring elements 22 may flex and may allow the blocking elements 15 to move inwardly. As the blocking elements 15 move inwardly, the plug blade apertures 24 may align with the plug blade sockets 28 in the receptacle 25 and may permit an electrical plug to be inserted into the receptacle 25. When the plug blade apertures 24 are aligned with the plug blade sockets 28, the safety assembly 1 may be in a biased position. When the plug blade apertures 24 are in the unbiased, or rest position, the plug blade apertures 24 and the plug blade sockets 28 may not be aligned, thus concealing and preventing access to the plug blade sockets 28. It should be noted that even in the "rest position", the plug blade apertures 24 may be under a bias, albeit a lesser bias than in the biased position. For example, the plug blade apertures 24 may be under constant bias and be moveable between the "biased position" where the plug blade apertures 24 align with the plug blade sockets 28 and the "rest position" where the plug blade apertures 24 are unaligned with the plug blade sockets 28.

FIG. 4 illustrates another particular implementation of a cover assembly 2. The cover assembly 2 of this particular implementation may include a cover 29 with a front surface 31 through which a plurality of plug blades apertures 30 may extend. As illustrated in FIG. 4, implementations of a cover assembly 2 may be configured to provide a screwless look, meaning that no cover screw apertures or cover screws are visible on the front surface 31 of the installed cover.

Referring to FIG. 5, in this particular implementation the cover 29 may be coupled with a mounting plate 32 that may include receptacle face apertures 36, keyhole slot mounting apertures 40, a spring element 34, and plate rail members 38. Mounting plates with other configurations are contemplated. The spring element 34 in the particular implementation illustrated in FIG. 5 may include two curved projections 33, 35 attached to the mounting plate at only one of their respective ends.

FIG. 6 illustrates a particular implementation of cover 29. In this implementation, cover plate rail members 81 on the rear surface 39 of the cover 29 may be configured to slidably couple with the rail members 38 of the mounting plate 32. Relevant teachings regarding the structure, materials, and use of rail members are found in U.S. Pat. No. 6,384,354 to Shotey et al. entitled "Cover for Electrical Switch" issued May 7, 2002, the contents of which are hereby incorporated herein by reference. The teachings of Shotey may be readily applied to the present implementations given the disclosure provided herein. When a cover 29 is slidably coupled with a mounting plate 32, the spring element 34 may bias the cover toward the side of the mounting plate 32 on which the spring element 34 is located. Depending on the orientation of the mounting plate 32 and the configuration of the spring element 34, the cover 29 may move upward, downward, horizontally, or even diagonally under the influence of the spring element 34. Also, referring to FIG. 6, other implementations may have the rear surface 39 of the cover plate 29 in contact with the receptacle face when the cover plate 29 is coupled with the mounting plate 32.

Figure 7B:
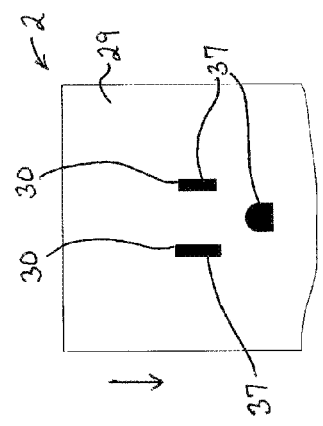
FIG. 7b is a front view of the cover of FIG. 7a in a biased position.
Figure 7A:
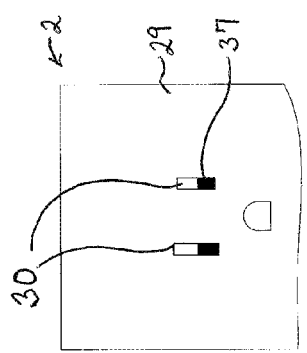
FIG. 7a is a front view of a cover in a rest position.

The cover assembly 2 illustrated in FIG. 7a shows the cover plate 29 biased upward by the spring element 34. When the cover 29 stops moving under the influence of the bias of the spring element 34, it may be in a rest position. FIG. 7a illustrates a cover assembly 2 in its rest position. For that implementation, the plug blade apertures 30 may not be aligned with the plug blade sockets 37 in the receptacle, and thus may at least partially conceal and prevent access to the plug blade sockets 37.

Referring to FIG. 7b, inserting a plug into the plug blade sockets 37 may require the cover 29 to be slid downward against the bias of the spring element 34 until the plug blade apertures 37 and plug blade sockets 37 align. When the plug blade apertures 30 and the plug blade sockets 37 align, the cover assembly 2 may be in a biased position. Particular implementations of a cover assembly 2 may include a mounting plate 32 that couples to an electrical box with various structures including, by non-limiting example, prongs, clips, wire, Velcro®, glue, screws, tape, or box mounting screw inserts. In addition, in some particular implementations, the thickness of the cover plate 29 around the plug blade apertures 30 may range from about 0.020 inches to about 0.075 inches. In particular implementations, the thickness of the cover 29 around the plug blade apertures 30 may range from about 0.020 inches to about 0.055 inches, more specifically from about 0.030 inches to about 0.055 inches, and most specifically from about 0.035 to about 0.045 inches.

Figure 8:
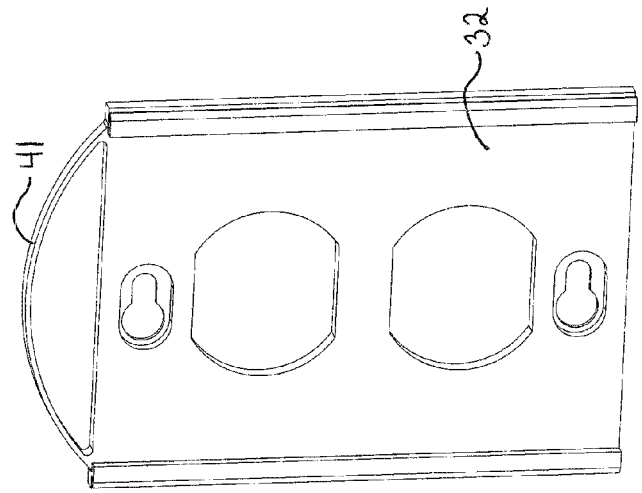
FIG. 8 is a front view of a mounting plate with a spring element having a curved projection attached to the mounting plate at both ends.

The particular implementation shown in FIG. 8, a spring element 34 includes a curved projection 41 attached to the mounting plate at both of its ends. Particular implementations of a mounting plate 32 may include a plurality of curved or other shaped projections attached at only one end or at both ends or at some other point on the projection. For example, a straight cantilevered projection may alternatively be used if properly configured. Other implementations may include combinations of spring elements 34.

FIGS. 9 and 10 illustrate a particular implementation of a cover assembly 3 that may include a frame 42. The frame 42 may include a mounting aperture 44 for a mounting plate 46. The mounting plate 46 may include mounting projections 50 configured to couple the mounting plate 46 at the mounting aperture 44. Relevant teachings regarding the structure, manufacture, and use of particular implementations of the frame 42, the mounting projections 50, and the mounting aperture 44 are found in U.S. Utility Patent Application by Shotey, et al. entitled "Electrical Cover Plate" Ser. No. 11/466,756 which was filed on Aug. 23, 2006, the contents of which were previously incorporated herein by reference. The mounting plate 46 may also include a spring element 48, plate rail members 54, and a receptacle face aperture 52.

Referring to FIGS. 11a and 11b, a particular implementation of a cover 56 is illustrated. The cover 56 may include a front face 57 through which a plurality of plug blade apertures 58 extend. On the rear surface 59 of the cover 56, a plurality of cover rail members 60 may be attached along the edges of the cover 56. On a side of the rear surface 59 of the cover 56, a bias projection 62 may extend configured to engage with the spring element 48 of the mounting plate 46 when the cover 56 and the mounting plate 46 may be slidably coupled with the cover rail members 60 and plate rail members 54.

Referring to FIG. 12, a frame 42 is shown installed over a duplex receptacle 62.

In FIG. 13, a frame 42 is shown installed over a ground fault current interrupter receptacle 64. In both figures, a mounting plate 46 with identical dimensions may be coupled with the frame 42 at the mounting aperture 44. As these figures illustrate, particular implementations of a mounting plate 42 may be capable of being installed over both duplex and ground fault current interrupter receptacles 62, 64 without a change of design dimensions or structure.

Referring to FIG. 14, a frame 42 is shown installed over a receptacle 25. A mounting plate 46 is coupled with the frame 42 and a cover 56 may be slidably coupled with the mounting plate 46. When the cover 56 was coupled with the frame 42, the spring element 48 of the mounting plate 46 pushed the cover assembly 3 to a rest position where the plug blade apertures 58 in the cover 56 concealed the plug blade sockets 37 in the receptacle 25. Insertion of a plug into the plug blade sockets 37 may be accomplished by siding the cover 56 against the bias of the spring element 48 until the plug blade apertures 58 and the plug blade sockets 37 may align with each other. In the implementation illustrated in FIG. 14, the cover 56 may be slid downward to align the plug blade apertures 58 with the plug blade sockets 37. When the plug blade apertures 58 and the plug blade sockets 37 are aligned, the cover assembly 3 may be in a biased position. In other particular implementations, depending on how the mounting plate 46 and the frame 42 are installed over the receptacle 25, the cover 56 may be slid upward, downward, horizontally or some other direction to align the plug blade apertures 58 and plug blade sockets 37.

Figure 15:
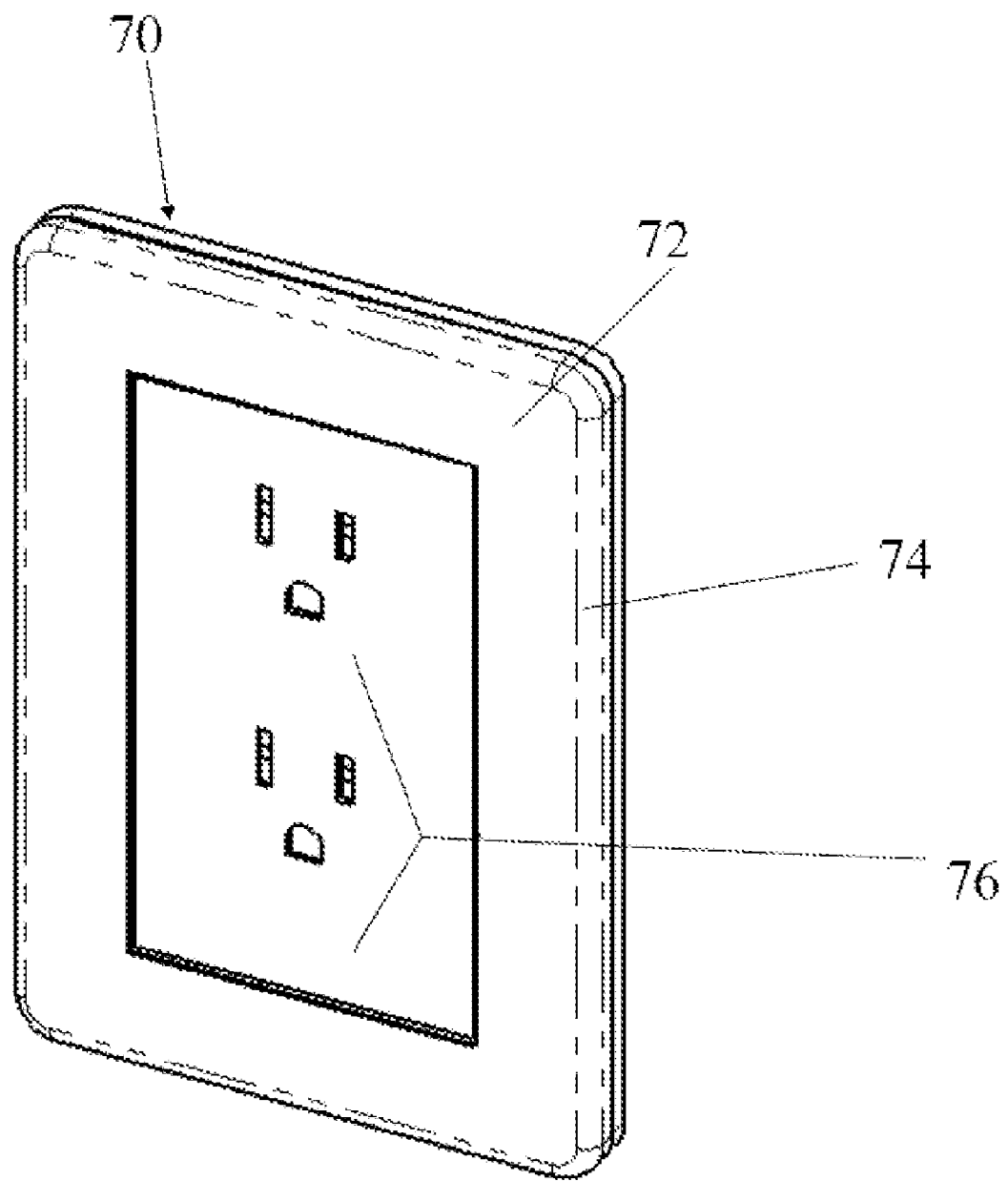
FIG. 15 is a front perspective view of a safety cover assembly.

FIG. 15 illustrates a particular implementation of a safety outlet cover assembly. The cover assembly 70 of this particular implementation may include a sliding cover plate 72 with a front surface 74 through which a plurality of plug blades apertures 76 may extend. As illustrated in FIG. 15, implementations of a cover assembly 2 may be configured to provide a screwless look, meaning that no cover screw apertures or cover screws may be visible on the front surface 74 of the installed cover.

Figure 16:
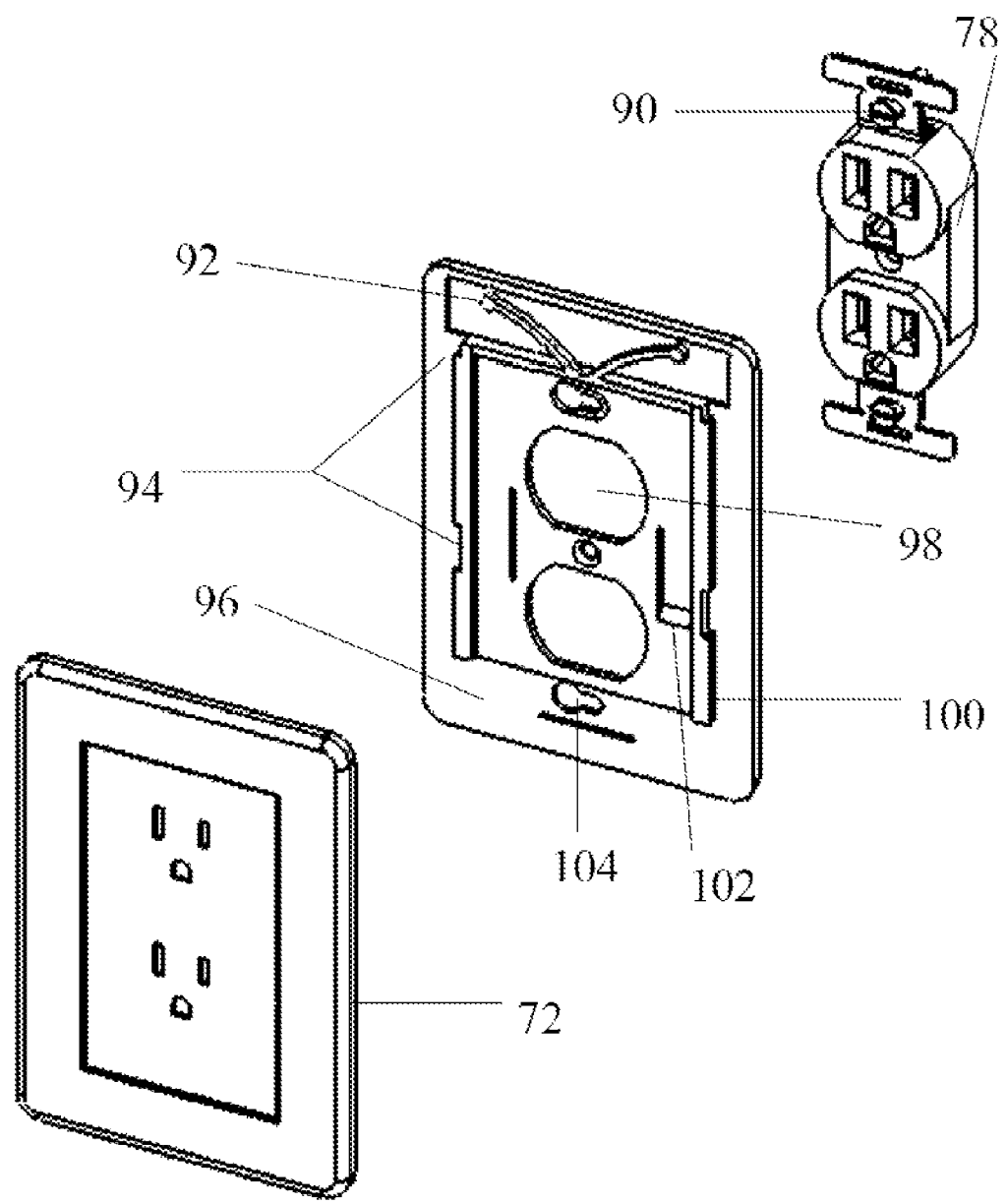
FIG. 16 is a front perspective exploded view of a safety cover assembly, a mounting plate and an electrical device.

Referring to FIG. 16, an exploded view of an implementation of a safety outlet cover is illustrated. In this particular implementation the sliding cover plate 72 may be coupled with a mounting plate 96 that may include receptacle face apertures 98, keyhole slot mounting apertures 104, a spring element 92, rail members 100 and a mounting plate catch 102. Mounting plates with other configurations are contemplated. The spring element 92 in the particular implementation illustrated in FIG. 16 may include at least one curved projection attached to the mounting plate at only one end. Particular implementations of a mounting plate 96 may include a plurality of curved or other shaped projections attached at only one end or at both ends or at some other point on the projection. For example, a straight cantilevered projection may alternatively be used if properly configured. Other implementations may include combinations of spring elements 92. FIG. 16 also illustrates an electrical device 78 upon which a mounting plate 96 may be removably coupled. With an electrical device 78 loosely installed, i.e. the screws 90 not tightened all the way, the keyhole slot mounting apertures 104 of a mounting plate 96 may be slidably positioned behind the screws the electrical device 78 so that the s keyhole slot mounting apertures 104 snugly receive the mounting screws 90.

Figure 17:
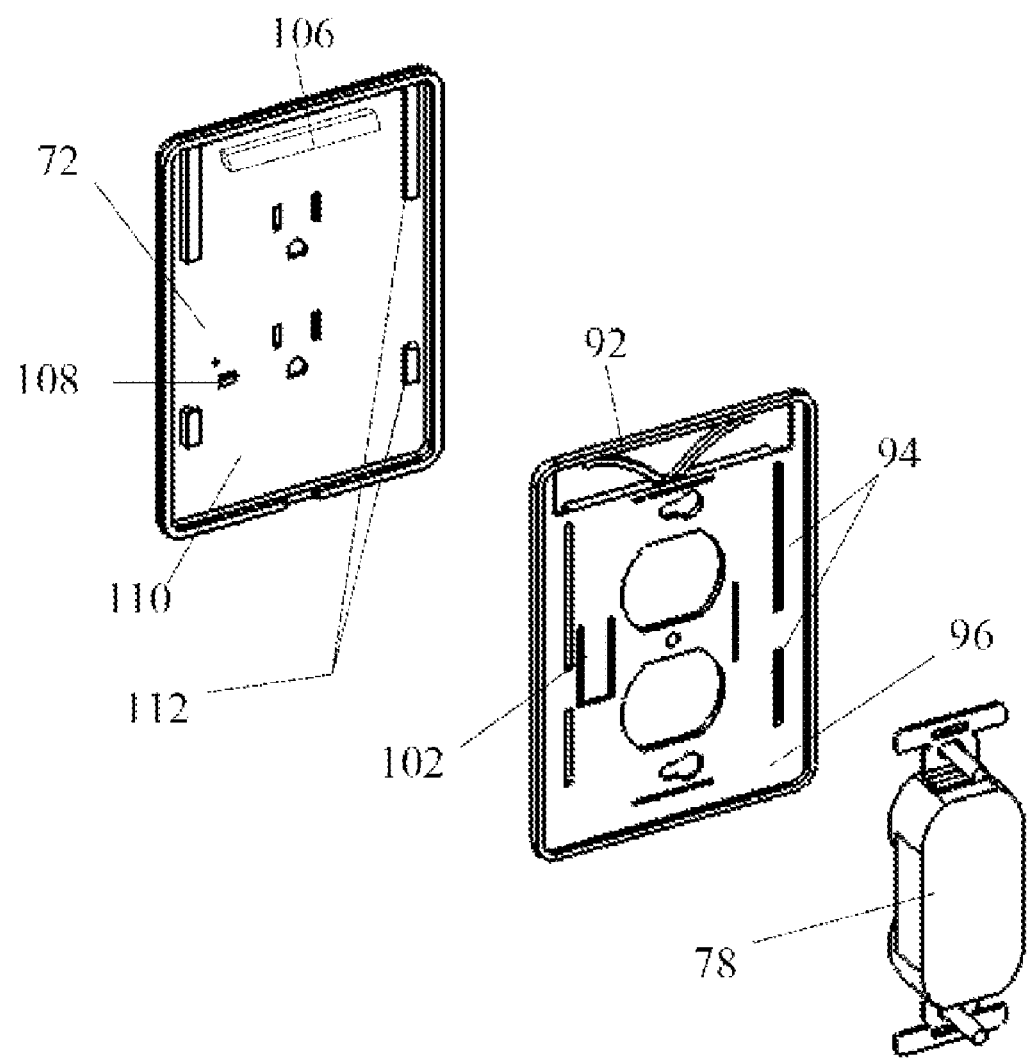
FIG. 17 is a rear perspective exploded view of a safety cover assembly, a mounting plate and an electrical device.

Referring to FIG. 17, in this particular implementation a sliding cover plate 72 that may include sliding cover plate rail members 112 and may be coupled with a mounting plate 96 that may include mounting plate rail members 94. A cover plate catch 108 may engage with a spring loaded pawl 102 on the mounting plate 96, which may prevent a user from sliding a cover plate past the position where the cover plate catch may engage with a mounting plate catch. Additionally, a bias projection 106 on the cover 72 may engage with a spring element 92 on the mounting plate which may prevent a user from sliding a cover plate past the position where the cover plate bias projection fully biases spring element 92. Mounting plates with other configurations are contemplated. When a sliding cover plate 72 is slidably coupled with a mounting plate 96, a spring element 92 within a frame 105 may bias the cover toward the side of the mounting plate 96 on which the spring element 92 is located. Depending on the orientation of the mounting plate 96 and the configuration of the spring element 92, the cover plate 72 may move upward, downward, horizontally, or even diagonally under the influence of the spring element 92.

Figure 18:
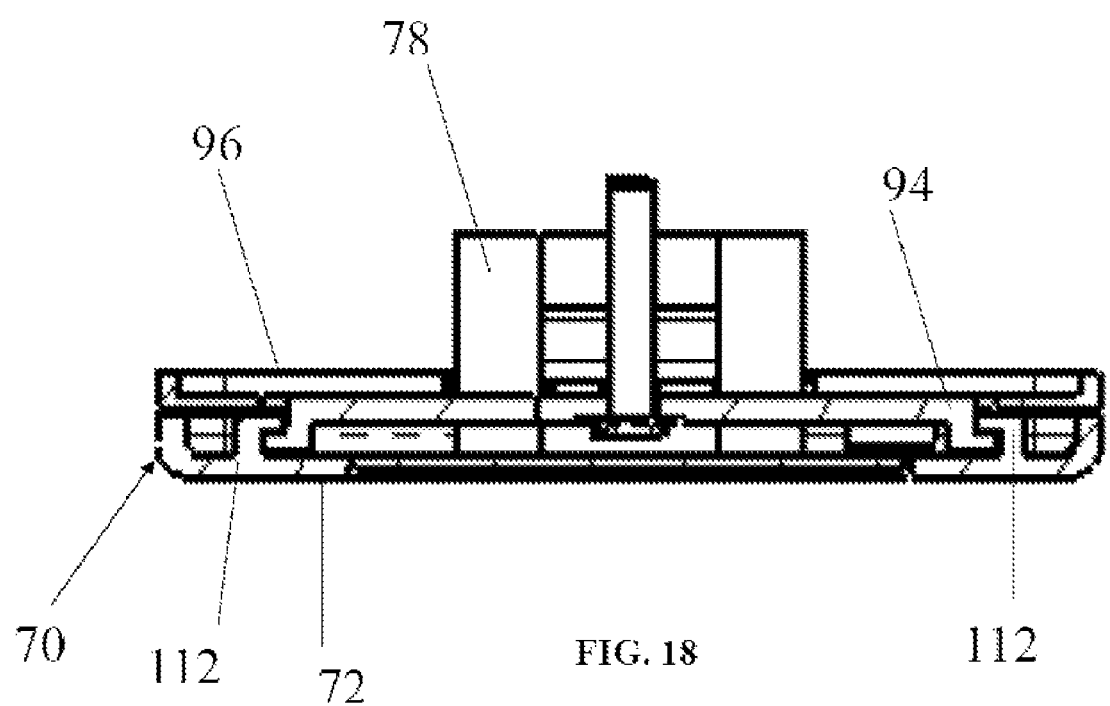
FIG. 18 is a top perspective view of a safety cover assembly, a mounting plate and an electrical device.
Figure 20:
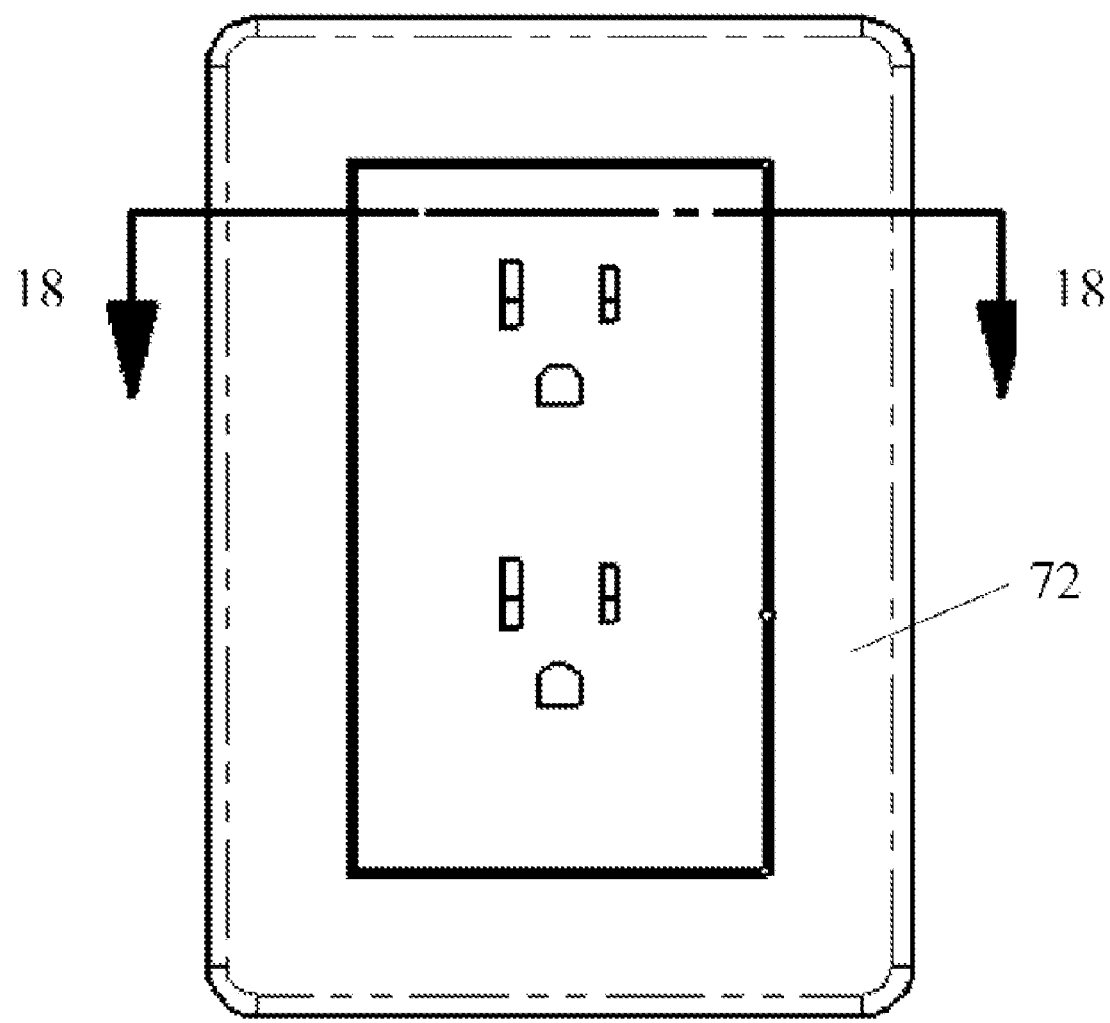
FIG. 20 is a front view of a safety cover assembly.

FIG. 18 shows a cross section of a safety outlet cover assembly taken along section line 18-18 of FIG. 20. In this implementation, sliding cover plate rail members 112 on the rear surface of the cover assembly 70 may be configured to slidably couple with the mounting plate rail members 94 of the mounting plate 96. The mounting plate rail members 94 may contain notches that may allow the sliding cover plate rail members 112 to be positioned above the mounting plate rail members 94, and then slid downward, thereby slidably removably coupling the sliding cover plate 72 to the mounting plate 96. The cover plate 72 may be slid up and down from a biased position to a rest position, and vice versa. Relevant teachings regarding the structure, materials, and use of rail members are found in U.S. Pat. No. 6,384,354 to Shotey et al.

entitled "Cover for Electrical Switch" issued May 7, 2002, the contents of which are hereby incorporated herein by reference. The teachings of Shotey may be readily applied to the present implementations given the disclosure provided herein.

Figure 19:
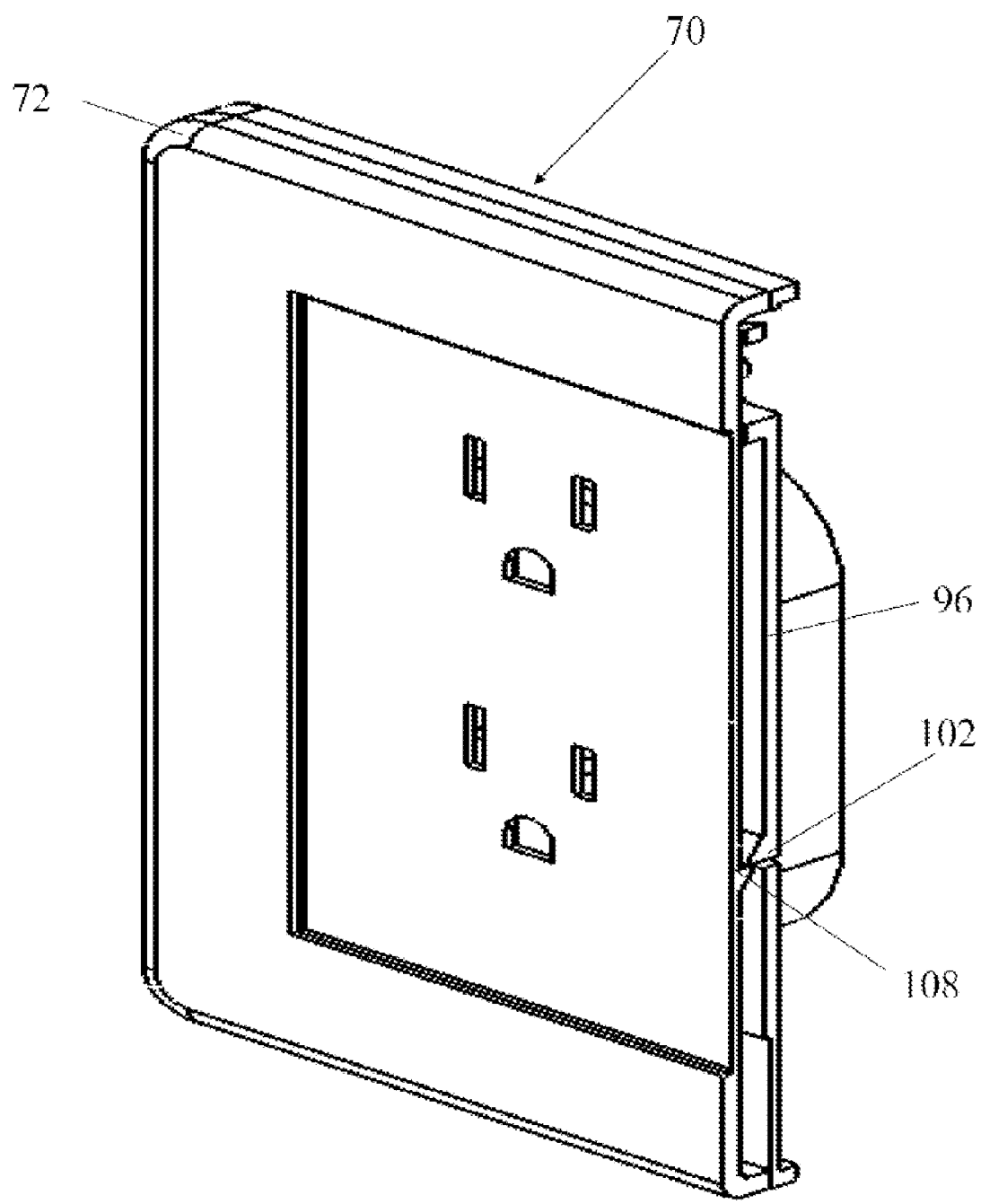
FIG. 19 is a three-quarter cut-away view of a safety cover assembly, a mounting plate and an electrical device.

FIG. 19 illustrates a cutaway view of a safety outlet cover with the right side removed. When a cover plate 72 is slidably coupled with a mounting plate 96, a cover plate catch 108 may slide past the spring loaded pawl 102 along their respective wedge shapes. The wedge shaped tab may allow the cover plate 72 to slide into place, and then may keep it from sliding back off. When the sliding cover plate 72 is in the rest position, the spring loaded pawl 102 on the mounting plate 96 may removably engage with the cover plate catch 108 on the sliding cover plate 72, and may prevent it from accidentally sliding off of the mounting plate 96. The spring loaded pawl 102 may be attached to the mounting plate 96 at only one of its' ends.

FIG. 20 shows a front view of a safety outlet cover assembly. A cross-section of FIG. 20, taken along cross-section line 18-18, is illustrated in FIG. 18.

Particular implementations of a cover assembly may include a mounting plate 96 that may couple to an electrical box with various structures including, by non-limiting example, prongs, clips, wire, Velcro®, glue, screws, tape, or box mounting screw inserts. In addition, in some particular implementations, the thickness of the cover plate 72 around the plug blade apertures 76 may range from about 0.020 inches to about 0.075 inches. In particular implementations, the thickness of the cover plate 72 around the plug blade apertures 76 may range from about 0.020 inches to about 0.055 inches, more specifically from about 0.030 inches to about 0.055 inches, and most specifically from about 0.035 to about 0.045 inches.

Figure 22:
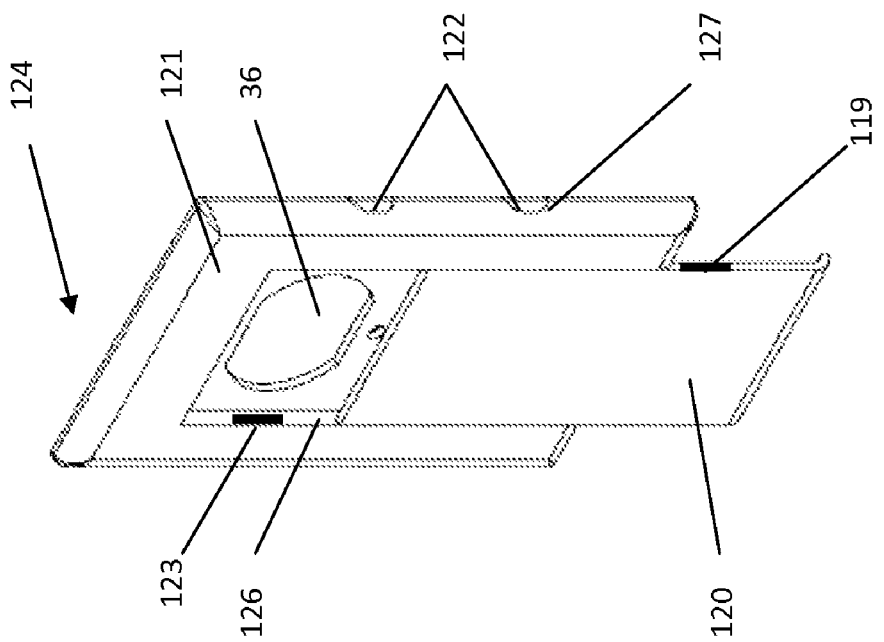
FIG. 22 is perspective view of the safety cover assembly of FIG. 21 in a first open position.
Figure 21:
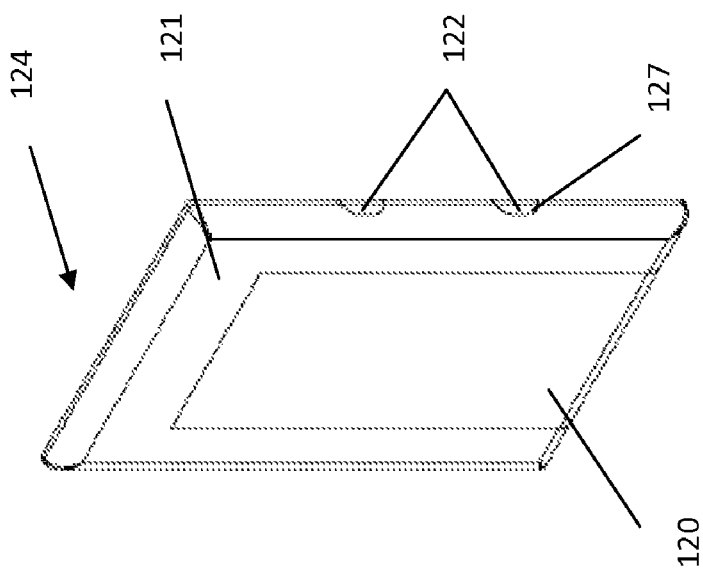
FIG. 21 is perspective view of an implementation of a safety cover assembly in a closed position.
Figure 23:
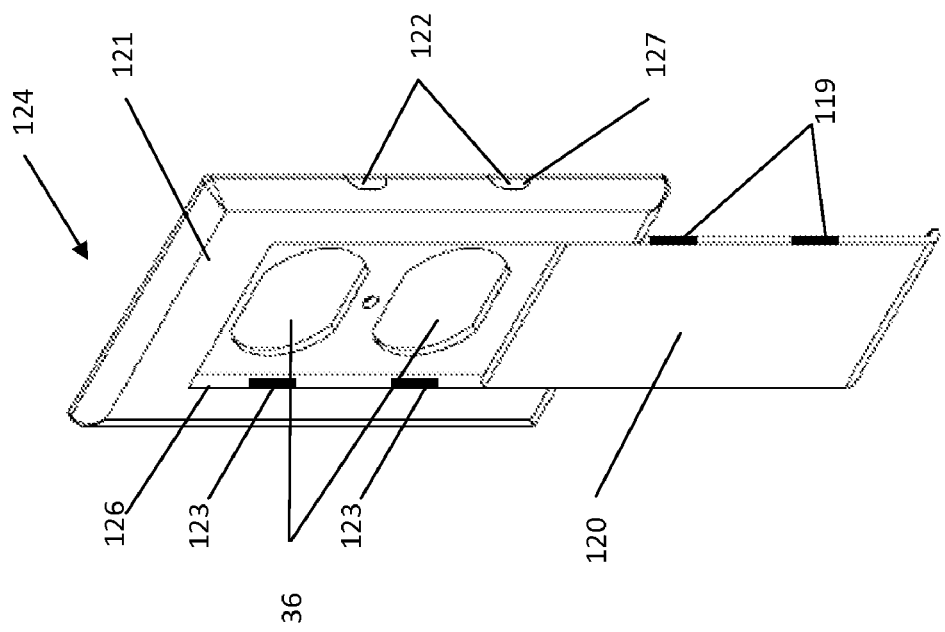
FIG. 23 is a perspective view of the safety cover assembly of FIG. 21 in a second open position.

FIGS. 21-23 show an implementation of a safety cover assembly 124 with the cover 120 in closed, and first and second open positions, respectively. In this implementation, the cover base 121 is coupled to an electrical receptacle such that receptacle face apertures 36 align with the electrical sockets of the receptacle. The cover base 121 has button openings 127 on opposing sides of cover base 121 through which cover release buttons 122, squeeze tabs, or other trigger-like devices (collectively cover release buttons) may protrude and be biased, such as through a spring or other biased component, to return to a default engaged position with respect to the cover 120. The cover 120 moves slidably along track 126 and may be positioned in a closed position such that receptacle face apertures 36 and electrical sockets extending through them are not exposed. Once in a closed position, the buttons 122 on opposing sides of the cover base 121 are each configured to engage, through a button projection 123, a respective side feature 119 of the cover 120 to restrict its movement unless both opposing buttons 122 are simultaneously depressed or otherwise activated to unlock the cover 120 and allow it to slide along track 126 to a first or second open position.

When in the first open position (FIG. 22), a receptacle face aperture 36 is exposed enough to receive a cord cap of an electrical plug and the second set of buttons closest the bottom of the cover base engage the cover to restrict its movement further open from the first open position until the opposing buttons 122 are depressed to unlock the cover 120 and allow it to slide along track 126 to its second open position (FIG. 23) wherein both of the receptacle face apertures 36 of this implementation are exposed enough to receive electrical cord caps. The buttons 122 may be biased to their engaged positions or otherwise moved to their respective engaged positions by the cover 120 when it is slid closed. The cover 120 may also be spring loaded so that it will automatically return to a closed position from an open position when an electrical plug is disconnected from the socket. It will be understood that the respective side features 119 of the cover 120 need not necessarily be recesses within the cover, but may be configured as a notch or even just a flat side portion, though a notch or recess 119 will work better for more firmly restricting the cover 120 movement. It will also be understood that although the present implementation is illustrated for a particular receptacle style and type, the principles illustrated may be applied to receptacles of other configurations and styles such as single receptacles, dual gang receptacles, ground fault circuit interrupter (GFCI) receptacles, decora receptacles, as well as others known in the art.

Figure 24:
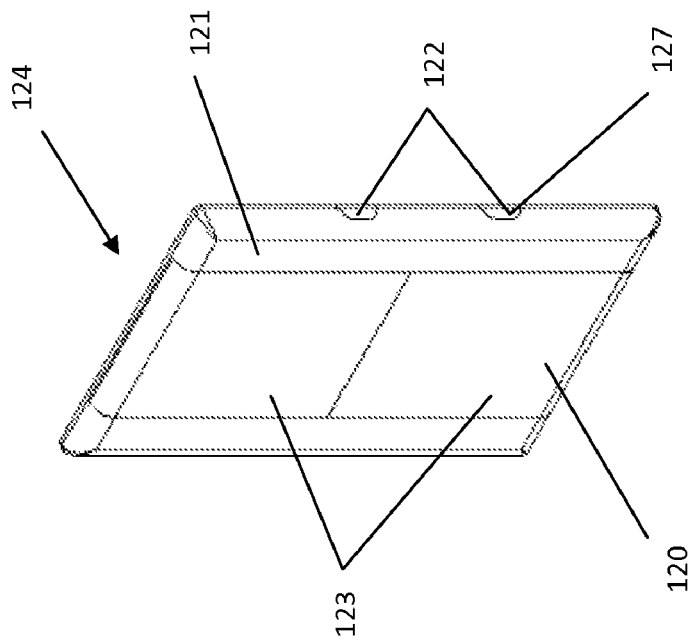
FIG. 24 is a perspective view of a safety cover assembly having two cover elements in a closed position.
Figure 25:
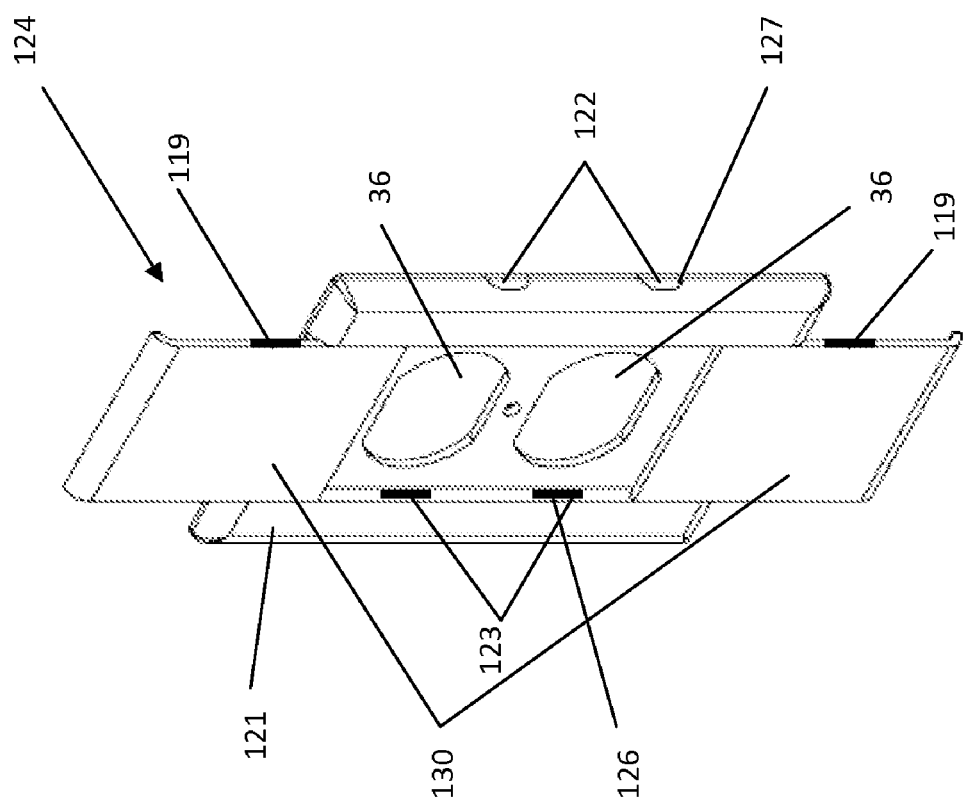
FIG. 25 is a perspective view of the safety cover assembly of FIG. 24 with the cover elements in an open position.

FIGS. 24 and 25 show an alternative application of a safety cover assembly 124 having a split cover that has two cover elements 130 such that each cover element 130 covers at least one socket aperture. The cover elements 130 independently slide outward from and in an opposite direction from the other of the at least two cover elements 130 when buttons 122 on opposing sides of the cover base 121 associated with that cover element are activated and the particular cover element 130 is moved from a closed to an open position. Each cover 130 can move independent of the other. These implementations of safety cover assembly 124 are intended to be mounted either vertically or horizontally on a wall surface. As with the implementation illustrated in FIGS. 21-23, the implementation of FIGS. 24-25 may be configured with biased cover elements to bias each of the cover elements 130 to its closed position wherein the corresponding receptacle face aperture, and receptacle face within that aperture is covered when an electrical cord cap is removed from the electrical receptacle.

Figure 26:
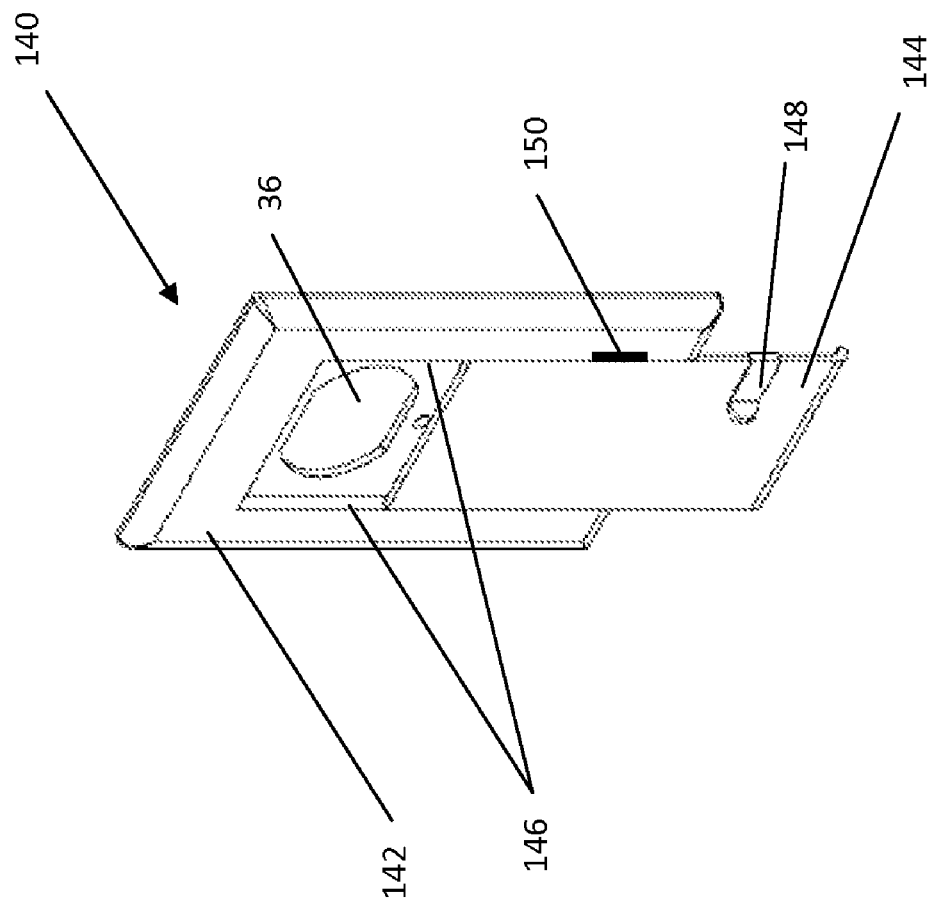
FIG. 26 is a perspective view of another implementation of a safety cover assembly in an open position.

FIG. 26 illustrates yet another alternative application of a safety cover assembly 140 having a cover base 142 and a cover 144 slidably mounted within a track 146 spanning across the receptacle face aperture 36. The cover 144 is configured to be slidably movable between a closed position and at least one open position. In the open position illustrated in FIG. 26, the cover 144 is not covering the receptacle face aperture 36. In the closed position, like the embodiment illustrated in FIG. 21, the receptacle face aperture 36 is covered. Like previous embodiments also, the cover 144 may be biased into the closed position by a spring or other biasing mechanism. In the closed position for the embodiment of FIG. 26, a cover release 148 is slidably coupled to the cover 144 and slidable between a latch position and an unlatch position. When the cover 144 is in the closed position and the cover release 148 is in the latch position, the cover release 148 engages with engaged with a latch recess 150 at an edge of the track 146 and resists the cover 144 from sliding within the track 146 and when the cover release 148 is in its unlatch position the cover release 148 does not resist the cover 144 sliding within the track 146 to the open position. The cover release 148 may be biased to its latch position, such as through the placement of a spring between the cover release 148 and the cover 144 on the side adjacent the latch recess 150 to automatically latch the cover 144 on the cover base 142 when the cover 144 is moved to its closed position.

It will be understood that implementations are not limited to the specific components disclosed herein, as virtually any components consistent with the intended operation of a method and/or system implementation for a safety outlet cover may be utilized. Accordingly, for example, although particular covers, mounting plates, spring elements, and receptacles may be disclosed, such components may comprise any shape, size, style, type, model, version, class, grade, measurement, concentration, material, weight, quantity, and/or the like consistent with the intended operation of a method and/or system implementation for a safety outlet cover may be used.

In places where the description above refers to particular implementations of a safety outlet cover, it should be readily apparent that a number of modifications may be made without departing from the spirit thereof and that these implementations may be applied to other safety outlet covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A safety cover assembly for an electrical outlet, comprising: a cover base comprising a track and at least one electrical outlet receptacle face aperture extending through a surface thereof and enough the receptacle face aperture sized to receive at least one face of an electrical receptacle therein and positioned within the track, and the cover base further comprising at least two button openings, at least one each on opposing sides of the cover base;
a cover slidably coupled to the cover base within the track and comprising at least an open position in which the at least one receptacle face aperture is exposed enough to receive an electrical cord cap therein and a closed position in which the at least one receptacle face aperture is covered by the cover;
two or more side features, at least one of the two or more side features on each of opposing sides of the cover;
at least two cover release buttons, each one comprising a button projection and extending through each of the button openings in the base, the cover release buttons each operatively coupled to the cover base and biased to an engaged position in which the button projections engage the side features of the cover and restrict its sliding movement within the cover base; wherein simultaneous activation of the two cover release.

2. The safety cover assembly of claim 1, wherein the cover is further slidably moveable to a second open position in which at least a second receptacle face aperture is exposed enough to receive the electrical cord cap.

3. The safety cover assembly of claim 2, wherein the at least two cover release buttons comprises at least four cover release buttons and the at least two button openings comprises at least four button openings, at least two each on opposing sides of the cover base, each button opening positioned adjacent a receptacle face aperture and having one of the at least two cover release buttons operatively engaged therein.

4. The safety cover assembly of claim 3, wherein activation of the opposing buttons adjacent the second receptacle face aperture releases the cover and allows it to slidably move to the second open position.

5. The safety cover assembly of claim 1, wherein the buttons are squeeze tabs.

6. The safety cover assembly of claim 1, wherein the at least two cover release buttons comprises at least four cover release buttons and the at least two button openings comprises at least four button openings, at least two each on opposing sides of the cover base, each button opening positioned adjacent one of the at least one receptacle face aperture and having one of the at least four cover release buttons operatively engaged therein.

7. The safety cover assembly of claim 6, wherein the cover is a split cover comprising at least two cover elements.

8. The safety cover assembly of claim 7, wherein the at least one receptacle face aperture comprises at least two receptacle face apertures, wherein each of the at least two cover elements is configured to independently slide away from the other of the at least two cover elements when respective opposing buttons adjacent each of the cover elements is simultaneously activated.

9. The safety cover assembly of claim 8, wherein each of the at least two cover elements is biased to its closed position such that when an electrical plug cap is removed from a corresponding receptacle face within the receptacle face aperture associated with the cover element, the corresponding cover slides along the track to its closed position and covers the corresponding receptacle face.

10. The safety cover assembly of claim 1, wherein the at least one cover is biased to its closed position such that when an electrical plug cap is removed from a receptacle face within the receptacle face aperture, the cover slides along the track to its closed position and covers that receptacle face.

11. A safety cover assembly for an electrical outlet, the assembly comprising:
a cover base comprising a track, at least one receptacle face aperture positioned within the track and extending through the cover base, and two or more button openings, at least one of the two or more button openings positioned on each of opposing sides of the cover base;
at least one cover slidable within the track between at least a first open position and a
closed position, the cover positioned to expose the at least one receptacle face aperture in the first open position and cover the at least one receptacle face aperture in the closed position; and
at least two cover release buttons each positioned within a different one of the at least two cover release buttons and biased to an engaged position in which the cover release buttons engage with the cover to restrict sliding of the cover within the track, the at least two cover release buttons responsive to simultaneous activation to allow sliding of the cover within the track.

12. The assembly of claim 11, further comprising:
two or more side features, at least one of the two or more side features on each of opposing sides of the cover; and
a button projection on each cover release button, wherein button projections engage with the side features in the engaged position and simultaneous activation of the cover release buttons disengages the button projections from the side features to allow sliding of the cover within the track.

13. The assembly of claim 12, wherein the at least one receptacle face aperture comprises two electrical face apertures, the two or more button openings comprise four button openings, the at least two cover release buttons comprises four cover release buttons, and the two or more side features comprises four side features, wherein two of the four button openings are positioned on opposing sides of the cover base.

14. The assembly of claim 12, wherein the cover exposes a first aperture of the two electrical face apertures and covers a second aperture of the two electrical face apertures in the first open position, covers both the first aperture and second aperture of the two electrical face apertures in the closed position, and exposes both the first aperture and the second aperture of the two electrical face apertures in a second open position.

* * * * *